US006603745B1

United States Patent
Antonio et al.

(10) Patent No.: US 6,603,745 B1
(45) Date of Patent: Aug. 5, 2003

(54) METHOD AND APPARATUS FOR REVERSE LINK OVERLOAD DETECTION

(75) Inventors: Franklin P. Antonio, Del Mar, CA (US); Walid Hamdy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/181,345

(22) Filed: Oct. 28, 1998

(51) Int. Cl.[7] ............................. H04B 7/185; H04Q 7/20
(52) U.S. Cl. ........................................ 370/318; 455/453
(58) Field of Search ............................... 370/318, 320, 370/332, 335, 342; 455/69, 70, 522, 453, 501, 561, 226.3, 423, 329; 375/200

(56) References Cited

U.S. PATENT DOCUMENTS

| | | | |
|---|---|---|---|
| 5,056,109 A | 10/1991 | Gilhousen et al. ............. 375/1 |
| 5,257,283 A | 10/1993 | Gilhousen et al. ............. 375/1 |
| 5,265,119 A | 11/1993 | Gilhousen et al. ............. 375/1 |
| 5,267,261 A | 11/1993 | Blakeney, II et al. ........... 375/1 |
| 5,267,262 A | 11/1993 | Wheatley, III .................. 375/1 |
| 5,455,967 A | 10/1995 | Amezawa et al. ............. 45/69 |
| 5,548,812 A | 8/1996 | Padovani et al. .......... 455/33.2 |
| 5,732,328 A | * 3/1998 | Mitra et al. .................. 455/522 |
| 5,757,846 A | * 5/1998 | Vasudevan .................. 375/200 |
| 5,825,835 A | * 10/1998 | Kingston et al. ........... 370/335 |
| 5,838,671 A | 11/1998 | Ishikawa et al. ............. 370/335 |
| 5,912,884 A | * 6/1999 | Park et al. .................. 370/331 |
| 6,002,942 A | * 12/1999 | Park ............................. 455/522 |
| 6,094,585 A | * 7/2000 | Dajer et al. ................. 370/335 |
| 6,185,431 B1 | * 2/2001 | Li et al. ..................... 455/522 |
| 6,317,600 B1 | * 11/2001 | Salonaho et al. ........... 455/453 |

FOREIGN PATENT DOCUMENTS

| | | |
|---|---|---|
| EP | 0731622 | 9/1996 |
| WO | 9824198 | 6/1998 |
| WO | 9824199 | 9/1998 |

OTHER PUBLICATIONS

Liu, et al. "SIR–Based Call Admission Control for DS–CDMA Cellular Systems" IEEE Journal of Selected Areas in Communications 12(4): 638–644 (1994).

* cited by examiner

*Primary Examiner*—Chau Nguyen
*Assistant Examiner*—Andy Lee
(74) *Attorney, Agent, or Firm*—Philip Wadsworth; Kent Baker; Bruce Greenhaus

(57) ABSTRACT

A detector is used to sample of set of power measurements of a receive signal. The receive signal may comprise one or more signals from remote users as well as interference. A variance of the set of power measurements is also determined. The variance is compared to an overload threshold value. If the variance exceeds the overload threshold value, for some period of time, the system is declaraed to be operating at a potentially unstable point. In this state, future connection originations are denied.

31 Claims, 5 Drawing Sheets

METHOD AND APPARATUS FOR REVERSE LINK OVERLOAD DETECTION

BACKGROUND OF THE INVENTION

I. Field of the Invention

The invention relates to communication systems. More particularly, the invention relates to load estimation and overload detection in a multiple access system.

II. Description of the Related Art

FIG. 1 is an exemplary embodiment of a terrestrial wireless communication system 10. FIG. 1 shows three remote units 12, 13, and 15 and two base stations 14. In reality, typical wireless communication systems may have many more remote units and base stations. In FIG. 1, the remote unit 12 is shown as a mobile telephone unit installed in a car. FIG. 1 also shows the fixed location remote unit 15 in a wireless local loop system and the portable computer remote unit 13 in a standard cellular system. In the most general embodiment, the remote units may be any type of communication unit. For example, the remote units may be hand-held personal communication system (PCS) units, portable data units such as a personal data assistant, or fixed location data units such as meter reading equipment. FIG. 1 shows a forward link signal 18 from the base stations 14 to the remote units 12, 13 and 15 and reverse link signal 19 from the remote units 12, 13 and 15 to the base stations 14.

In the discussion that follows, to aid in illustration, the invention is described with reference to a commonly known, wireless link industry standard. In fact, the generic principles of the invention can be directly applied to many multiple access communication systems. The discussion that follows assumes operation in accordance with the system described in TIA/EIA/IS-95-A published by the Telephone Industry Association entitled "Mobile Station-Base Station Compatibility Standard for Dual-Mode Wideband Spread Spectrum Cellular System" commonly referred to as IS-95.

In a typical wireless communication system, such as that illustrated in FIG. 1, some base stations have multiple sectors. A multi-sectored base station comprises multiple independent transmit and receive antennas as well as independent processing circuitry. The principles discussed herein apply equally to each sector of a multi-sectored base station and to a single sectored independent base station. For the remainder of this description, therefore, the term "base station" can be assumed to refer to either a sector of a multi-sectored base station or a single sectored base station.

In systems using IS-95, remote units use a common frequency bandwidth for communication with all base stations in the system. Use of a common frequency bandwidth adds flexibility and provides many advantages to the system. For example, use of a common frequency bandwidth enables a remote unit to simultaneously receive communication signals from more than one base station, as well as transmit a single signal for reception by more than one base station. The remote unit discriminates between the simultaneously received signals from the various base stations through the use of the spread spectrum CDMA waveform properties. Likewise, the base station can discriminate and separately receive signals from a plurality of remote units.

Various methods exist for transferring communication with the remote unit from one base station to another through a process known as handoff. Handoff may be necessary if a remote unit operating in the coverage area of an original base station moves into the coverage area of a target base station. One method of handoff used in CDMA systems is termed a "soft" handoff. Through the use of soft handoff, communication with the target base station is established before termination of communication with the original base station. When the remote unit is communicating with two base stations, both the remote unit and base stations create a single signal from the multiple received signals. Through the use of soft handoff, communication between the remote unit and the end user is uninterrupted by the eventual handoff from an original base station to the target base station. U.S. Pat. No. 5,267,261 entitled "MOBILE STATION ASSISTED SOFT HANDOFF IN A CDMA CELLULAR COMMUNICATIONS SYSTEM," assigned to the assignee of the present invention and incorporated herein by this reference, discloses a method and system for providing communication with a remote unit through more than one base station during the handoff process.

In a wireless system, maximizing the capacity of the system in terms of the number of simultaneous calls that can be handled is extremely important. System capacity in a spread spectrum system is increased if the power received at the base station from each remote unit is controlled such that each signal arrives at the base station receiver at the minimum level required to maintain the link. If a signal transmitted by a remote unit arrives at the base station receiver at a power level that is too low, the signal to interference ratio may be too low to permit high quality communication with the remote unit. If, on the other hand, the remote unit signal arrives at a power level that is too high, communication with this particular remote unit is acceptable, but the high power signal acts as interference to other remote units. This excessive interference may adversely affect communications with other remote units. Thus, in general, a remote unit located near the base station transmits a relatively low signal power while a remote unit located at the edge of the coverage area transmits a relatively large signal level.

In order to increase capacity, the power transmitted by a remote unit over the reverse link may be controlled by each base station through which active communication is established (i.e. each base station with which the remote unit is in soft handoff.) Each base station though which communication is established measures the received signal to interference ratio and compares it to a desired set point. Each base station, periodically, generates and sends a power adjustment command to the remote unit. The power adjustment commands puncture the user traffic data on the forward link traffic channel.

The power adjustment command orders the remote unit to either increase or decrease the power at which it is transmitting the reverse link. signal. The remote unit increases its transmit power level only if every base station commands an increase. In this way, the transmit signal power of a remote unit in soft handoff is controlled mainly by the base which receives its signal at the highest signal to interference ratio. A system for base station and remote unit power control is disclosed in U.S. Pat. Nos. 5,056,109, 5,265,119, 5,257,283 and 5,267,262 which are incorporated herein.

The power adjustment commands compensate for the time-varying path loss in the wireless channel. Path loss in the wireless channel is defined as degradation or loss suffered by a signal as it travels between the remote unit and the base station. Path loss is characterized by two separate phenomenon: average path loss and fading. In a typical wireless system, the forward link and reverse link operate on different frequencies. Nevertheless, because the forward and reverse links operate within the same frequency band, a significant correlation exists between the average path loss of the two links. On the other hand, fading is an independent phenomenon for the forward and reverse link and varies rapidly as a function of time, especially when the remote unit is in motion or is located near objects in motion.

In the terrestrial environment, multipath is created by reflection of the signal from obstacles in the environment, such as buildings, trees, cars, and people. If an ideal impulse is transmitted over a multipath channel, the received signal appears as a stream of pulses. In general, the terrestrial channel is a time varying multipath channel due to the relative motion of the structures that create the multipath. If an ideal impulse is transmitted over a time varying multipath channel, the received stream of pulses changes in time offset, attenuation, and phase as a function of the time at which the ideal impulse is transmitted.

The multipath characteristic of a channel can result in signal fading. Fading is the result of the phasing characteristics of the multipath channel. A fade occurs when multipath vectors are added destructively, yielding a received signal that is smaller than either individual vector. For example, if a sine wave is transmitted through a multipath channel having two paths where the first path has an attenuation factor of X dB, a time delay of delta with a phase shift of 2 radians, and the second path has an attenuation factor of X dB, a time delay of delta with a phase shift of 2+B radians, no signal would be received at the output of the channel.

In an exemplary wireless system, each remote unit estimates the path loss of the forward link based on the total power at the input of the remote unit. The total power is the sum of the power from all base stations operating on the same frequency assignment as perceived by the remote unit. From the estimate of the average forward link path loss, the remote unit sets a transmit power level of the reverse link signal. As noted above, each base station with which the remote unit has established communications sends power adjustment commands to the remote unit to compensate for differences between the path loss on the forward link and the path loss on the reverse link, for fading, and for other sources of error.

Each base station in a system defines a coverage area in which the base station is capable of servicing remote units. Each base station coverage area has a hand-off boundary. A hand-off boundary is defined as the physical location between two base stations where the link performs the same regardless of whether the remote unit is communicating with the first or the second base station. The performance of the reverse link is a function of the interference perceived at the corresponding base station receiver. For this reason, the location of the hand-off boundary and, hence, the size of the coverage area is a function of the interference received at the base station. Therefore, all other conditions remaining static, an increase in the number of users communicating through the base station decreases the effective size of the coverage area of a base station and causes the hand-off boundary to move inward toward the base station.

If a minimum acceptable signal quality is specified, an upper bound on the number of simultaneous users which can communicate through a base station can be calculated. This upper bound is commonly referred to as pole capacity. The ratio of actual number of users to pole capacity is defined as the loading of the system. As the number of actual users approaches the pole capacity, loading approaches unity. A loading close to unity implies potentially unstable behavior of the system. Unstable behavior can lead to degraded performance in terms of voice quality, failed handoffs, and dropped calls. In addition, as loading approaches unity, the size of the coverage area of the base station shrinks such that users on the outer edge of the no-load coverage area may no longer be able to transmit sufficient power to communicate with the base station at an acceptable signal quality.

For these reasons, it is advantageous to limit the number of users which access the system such that loading does not exceed a specified percentage of the pole capacity. One way to limit the loading of the system is to deny access to the system once the loading of the system has reached a predetermined level. For example, if the loading increases above 70% of the pole capacity, it is advantageous to deny requests for additional connection originations and to refrain from accepting hand-off of existing connections.

In order to limit the loading on the reverse link to a specified level, it is necessary to measure the reverse link loading. Reverse link loading of a base station is not solely a function of the number of remote units that are operating within the coverage area of the base station. Reverse link loading is also a function of interference from other sources. The front end noise of the base station itself is a significant source of interference. In addition, other remote units operating on same frequency within the coverage area of nearby base stations may contribute significant interference.

One means by which the reverse link loading can be measured is by averaging the measured signal to interference operation point of all active connections within the coverage area. This approach has several drawbacks. The signal to interference operation statistics of the active connections provide an indication of system performance. However, they do not provide any information concerning the amount of interference from remote units located in the coverage area of other base stations. In addition, when a remote unit is in soft hand-off between two or more base stations, it is likely that the actual signal to interference ratio at which the reverse link signal is received at any one base station is significantly beneath the signal to interference ratio set point determined by the system, thus, falsely indicating on extremely high loading level. For these reasons, measuring the average signal to interference operation point of all active connections within a base station does not provide an accurate measure of reverse link loading.

A second and simple means of determining reverse link loading is to simply count the number of active users in the base station. However, because the level of interference from other sources may significantly affect loading, it should be clear that the number of users is not necessarily a good indication of reverse link loading. In addition, the effects of soft hand-off greatly decrease the correlation between the number of active users and the actual loading at the base station.

A third means of estimating the reverse link loading is to attempt to derive the reverse link loading based upon an estimate of the forward link loading. However, as noted above, in a typical system the forward and reverse link do not operate at the same frequencies. Therefore, the forward link performance is not perfectly correlated with reverse link performance. For example, the interference from the coverage areas of adjacent base stations may be different on the forward link than on the reverse link. In addition, as noted above, the effects of fading are independent on the forward and reverse links.

If one of these inaccurate methods of estimating the reverse link loading is used, the system cannot accurately determine whether connection blockage is necessary. If calls are blocked unnecessarily, the capacity of the system is unnecessarily decreased. On the other hand, if the loading is permitted to approach the pole capacity, the probability of dropping a significant number of active connections increases. For this reason, it is important to have an accurate estimation of the reverse link loading.

Reverse link loading is defined as a function of the total received power perceived at the base station receiver. The reverse link loading X is directly related to the total power received by the base station according to the following formula:

$$\frac{P_a}{P_n} = \frac{1}{1-X} \quad (1)$$

where:
- $P_a$ is the actual power received at the base station;
- $P_n$ is the power received at no external loading (i.e. the power due to the thermal noise floor of the base station); and
- X is the reverse link loading in terms of the ratio of actual loading to pole capacity.

Or equivalently, expressed in terms of X, Equation 1 takes on the following expression:

$$X = \frac{P_a - P_n}{P_a} \quad (2)$$

For example, this formula states that at 50% loading (X=0.5), the total power received at the base station is twice that which is received at no loading.

Given the relationship shown in Equation 1, current base station loading X can be determined based upon a known no load power level and an actual measurement of the total power received at the base station. Note that the actual power measurement must be filtered with an appropriate time constant in view of the time constant at which the power control operation varies the transmit power of the remote unit. In addition, if the reverse link operates at variable data rates which result in gated transmissions from the remote unit, the actual power measurement must be filtered to average the effects of the gated transmissions on the instantaneous power measurement.

The dynamic range of the relative power measurement $(P_a/P_n)$ is not large in a typical system. For example, as the loading X increases from 0 to 90% of the pole capacity, the ratio of $(P_a/P_n)$ increases from 0 to 10 decibels (dB). Typically, in order to avoid a large reduction in the size of the coverage area of a base station, base station loading X is limited to about 60–75% of the pole capacity. As X increases from 0.6 to 0.75, the ratio of $(P_a/P_n)$ increases from about 4 to about 6 dB. Therefore, to accurately limit the loading of the reverse link, the ratio of $(P_a/P_n)$ must be measured with less than 1 dB of error.

While this approach appears to be straight-forward, in reality, it is difficult to consistently achieve the required accuracy of the relative power measurements. For example, accurately measuring the noise floor $(P_n)$ of a base station in an operating environment is difficult. In addition, even if an accurate measurement of the noise floor could be made at one time, the noise floor is sensitive to gain and noise figure variations due to temperature, aging and other phenomenon and, hence, changes as a function of time. The accuracies obtained with this approach in actual field trials are not sufficient to allow Equation 2 to be used without a risk of significant over or under estimation of the actual loading. As a result, any admission control algorithm based upon Equation 2 will likely block connections when no blocking is necessary or admit connections in the face of potentially unsteady system behavior.

For these reasons, there has been a long felt need in the industry for a method and apparatus for accurately estimating the reverse link loading of a system.

SUMMARY OF THE INVENTION

In a first embodiment, a set of power level measurements of a signal received at a base station are sampled. A moment, such as the variance, of the set of power level measurements is determined. From the moment, a level of loading is determined which can be used in an admission control process, base station breathing process and the like.

In another embodiment, a set of power level measurements of a signal received at a base station are sampled. A moment, such as the variance, of the set of power level measurements is determined. The moment is compared to an overload threshold value. If the moment exceeds the overload threshold, an overload condition is detected and further connection originations may be denied.

BRIEF DESCRIPTION OF THE DRAWINGS

The features, objectives, and advantages of the invention will become more apparent from the detailed description set forth below when taken in conjunction with the drawings.

DETAILED DESCRIPTION OF THE INVENTION

Figure 1:
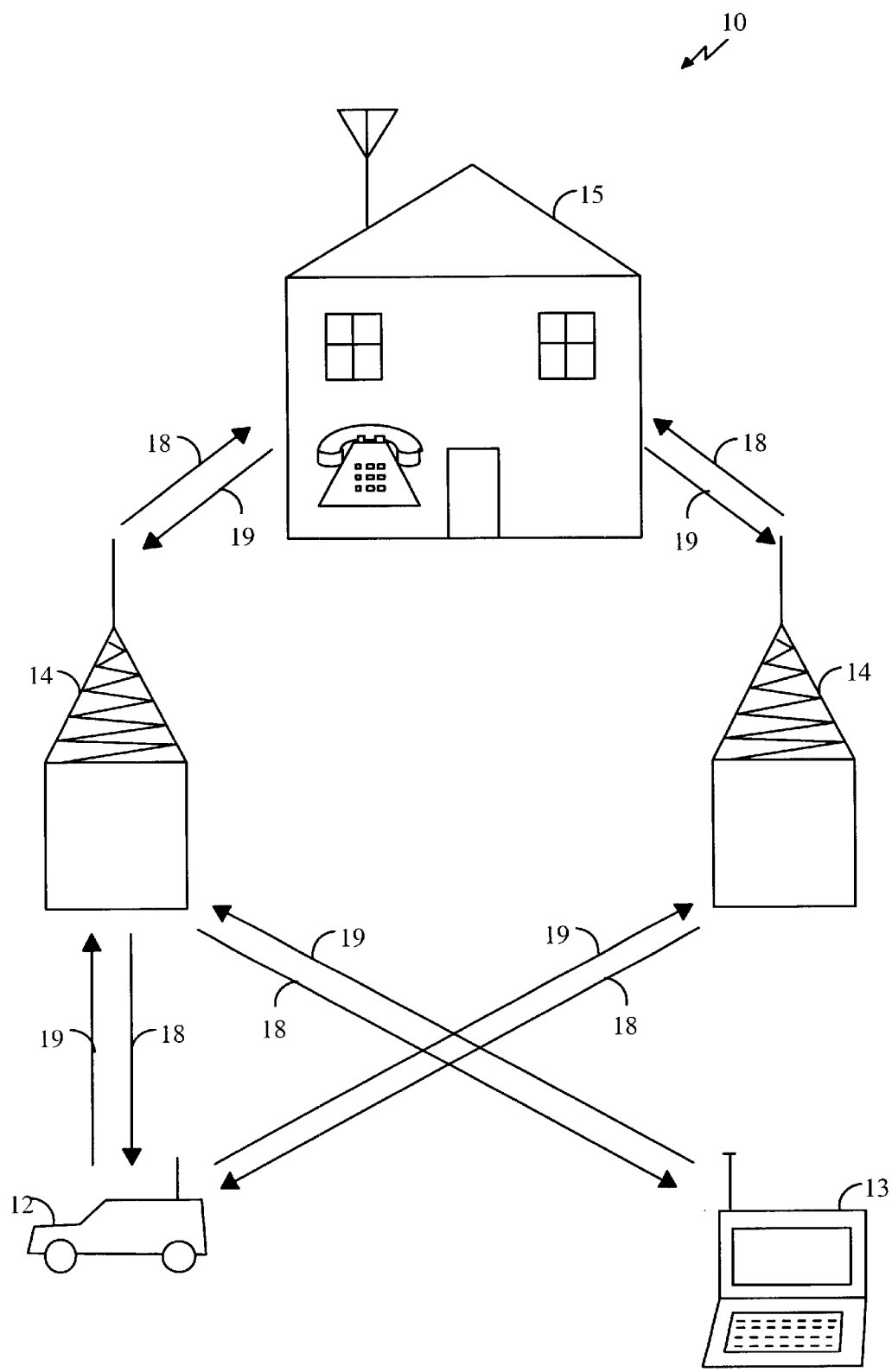
FIG. 1 is a conceptual drawing showing an exemplary embodiment of a terrestrial wireless communication system.

Equation 3 expresses the empirical relationship of the loading of a system as a function of the measured variance of the received power.

$$X = \frac{\mathrm{var}(P_a)}{(\overline{P_a})^2} \alpha \quad (3)$$

where:
- X is the reverse link loading in terms of the ratio of the actual loading to the pole capacity;
- $P_a$ is the actual power received at the base station;
- $\mathrm{var}(P_a)$ is the variance of the actual power received at the base station;
- $\overline{P}_a$ is the average of the actual power received at the base station; and
- α is an empirically determined system constant. According to Equation 3, measurement of the loading uses not only an actual power measurement but also the variance of the actual power measurement and is less dependent on a precise measurement of the absolute value of the actual power received at the base station.

In a general embodiment, the value of α is a function of the estimated characteristics (i.e. moments and signal quality set point) of several categories of remote units. α may be a function of the actual or expected number or ratio of users in one or more categories. For example, in a combined cellular and wireless local loop system, the value of α may vary as a function of the expected ratio of the number of mobile remote units to the number of fixed location remote units. In another embodiment, α is dependent upon the power received at the base station with no external loading (i.e., the power due to the thermal noise floor of the system). In another embodiment, α is dependent upon the signal quality set point of the system expressed, for example, in terms of the energy per bit to the average interference power density. In yet another embodiment, α is dependent upon a predicted standard deviation of a single remote unit's signal quality as received at the base station. In addition, α can be a function of one or more of these factors.

The empirical relationship between the variance and the loading as shown in equation 3 is due to the manner in which wireless systems operate. In a typical system, the transmit power of each remote unit is controlled in an attempt to adjust the power received at the base station from the remote unit to a predetermined level. In some systems, the predetermined level is measured by detecting a signal quality at which the signal is received such as a signal to interference ratio. During operation, the power received at the base station from each remote unit varies to some degree below and above the predetermined level. For example, if the path from the remote unit to the base station experiences an abrupt and deep fade, the power level at the base station falls below the predetermined level for the duration of the fade or until the power control loop can react to adjust it. In a typical system, power adjustment commands are sent to the remote unit from the base station 800 times per second for a maximum adjustment rate of 800 dB/sec. In a typical mobile environment, fades of 30 dB can occur at within a period of approximately 250 milliseconds. Thus, in an operating system, the power level received at the base station from each remote unit has an average power approximately equal to the predetermined set point and has a predictable variance by which the power level deviates from the set point. The variance is a function of the power control loop delay. More delay associated with the power control loop leads to a higher predicted variance.

An IS-95 compliant remote unit transfers data formatted into frames. The data within the frames is generated by a variable rate vocoder or digital data source. According to IS-95, the variable rate data takes on one of four rates depending on the amount of user information within the frame. For example, if an audio signal is simply background noise, the data is produced at one eighth of the full rate. If the audio signal is an active voice, the data rate increases to one quarter of the full rate, one half of the full rate or to full rate. A new data rate can be determined every 1.25 milliseconds (msecs) and, thus, the data rate is responsive to short term audio signal characteristics. The power level in each frame is proportional to the data rate. For example, an eighth rate frame has one eighth the power of a full rate frame. For this reason, the power level received at the base station from each remote unit is a function of the data rate at which the remote unit is transmitting which is, in turn, a function of the characteristics of the audio signal. Audio signals formatted into variable rate frames can be characterized as having a predictable average rate and a predictable variance about the average rate. It follows then that the power level received at the base station from each remote unit operating in a voice mode can also be characterized by a predictable average level and a predictable variance about the average.

In addition, interference from remote units operating in the coverage areas of neighboring base stations are characterized in the same manner as the active users and contribute to the average power received at a base station. Because the power received at the base station varies as a function of time, it can be characterized as having an average level and a variance. The variance of the receive power at the base station is a function of the remote units communicating through the base station and the interference from remote units communicating with other base stations. In this way, the variance is a function of the loading of the base station. As the loading increases, so does the variance of the received power. It is upon this principle that the present invention operates.

As noted above, estimating the absolute receive power to determine system loading is difficult because of the accuracy with which the determination of absolute power must be made in order to provide meaningful results. Absolute power measurements on the order of +/−0.5 dB are required but are difficult to obtain because of the dependence of the measurement on the receive path gain. The receive path gain can vary +/−3 dB or more depending on temperature, aging, component tolerances as well as other factors. However, the accurate measurements of the short term variance of the receive power measured in dB is much less sensitive to these factors. The slowly changing receive path gain variations are effectively constant additive terms which do not contribute to the short term variance of the receive power level.

The fluctuations in the power level received at the base station depend upon the wireless link characteristics. For example, wireless link characteristics which influence the fluctuations in the power level include the presence of large reflective objects which increase the effects of fading in the system. Another characteristic is the design of the physical layer interface such as the rate and delay at which power control operates to correct for power level fluctuations. In addition, the character of the remote unit itself influences the fluctuations in power level. For example, a fixed location remote unit in a wireless local loop system exhibits a lower level of fluctuations than a portable remote unit in a mobile environment due to the rapid fading experienced by a remote unit in motion. In addition, a mobile system dominated by ambulatory users, such as a wireless system installed in an office building, exhibits a lower variance than a system dominated by fast moving vehicle mounted units. In addition, a remote unit transmitting a data signal is likely to exhibit a lower variance than a remote unit transmitting a voice signal. In general, the fluctuations in the power level received at the base station is a function of the standard deviation in the power level of the signals received at the base station from the various remote units it is serving as well as the remote units generating interference from within the coverage areas of neighboring base stations.

Figure 2A:
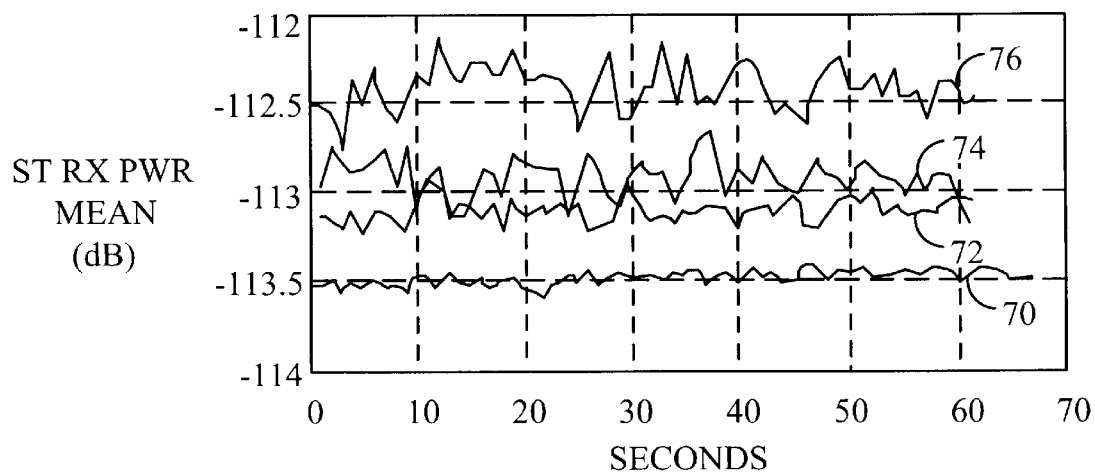
FIG. 2A is a graph showing the average receive power at a base station as a function of time.

FIG. 2A is a graph showing the short term mean receive power (averaged over 1 second intervals) at a base station as a function of time. The vertical axis is the power level received in decibels referred to a milliwatt (dBm) and the horizontal axis is time in seconds. Four different loading levels are depicted on FIG. 2A. Curves 70, 72, 74 and 76 correspond to one remote unit connection, 7 remote unit connections, 10 remote unit connections and 16 remote unit connections. Notice that the power level varies as a function of time due to voice activity, fading, power control as well as other factors.

Figure 2B:
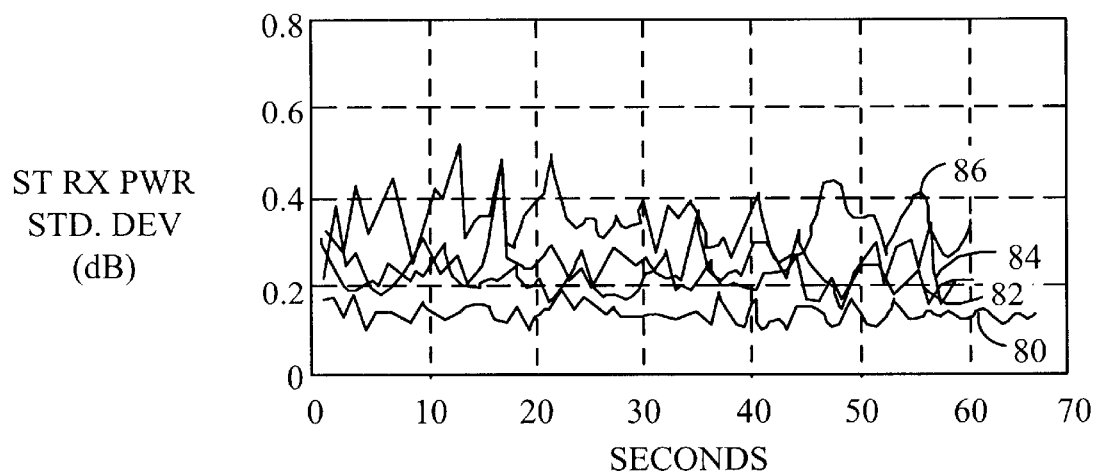
FIG. 2B is a graph showing the standard deviation of the receive power at the base station.

FIG. 2B is a graph showing the standard deviation of the receive power at the base station over the same time period as shown in FIG. 2A. The vertical axis is the standard deviation of the receive power level in units of decibels (dB) and the horizontal axis is time in seconds. The same four loading levels are depicted as in FIG. 2A and curves 80, 82, 84 and 88 correspond to one remote unit connection, 7 remote unit connections, 10 remote unit connections and 16 remote unit connections. Notice that the average value of the standard deviation increases with the increasing number of remote unit connections.

In one embodiment, the loading can be calculated as given above and used to control one or more functions of the base station. For example, the predicted loading can be used to influence the signal quality set point at the base station. The predicted loading can also be used to influence the operation of the power control mechanism. The predicted loading can also be used in a base station breathing mechanism such as the one disclosed in U.S. Pat. No. 5,548,812 entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM." In addition, loading can also be used in a data rate control algorithm which is used to limit the rate at which variable rate remote units may transmit data.

Figure 3:
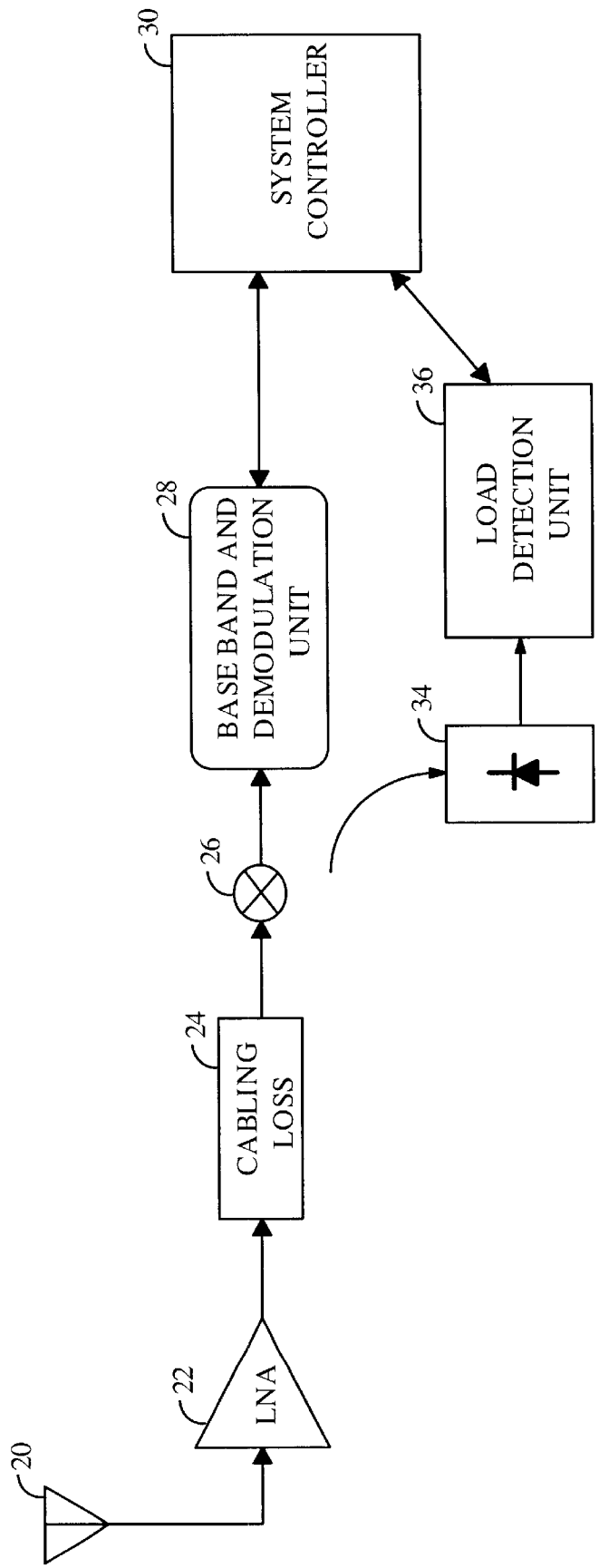
FIG. 3 is a block diagram showing an exemplary embodiment of a system incorporating a load detection unit.

FIG. 3 is a block diagram showing an exemplary embodiment of a system incorporating a load detection unit. The system in FIG. 3 is the receiver in a base station of a wireless communication system. An antenna 20 receives the radio frequency wireless link signals. The antenna 20 passes the radio frequency signals to a low noise amplifier 22. The low noise amplifier 22 amplifies the received signal level to a usable level. Typically, the antenna 20 and the low noise amplifier 22 are located in close proximity to one another at a location which allows the antenna 20 to receive signals within the desired coverage area. The remaining elements of the base station are often located at some distance from the antenna 20 and the low noise amplifier 22. For example, in a cellular system, the antenna 20 and the low noise amplifier 22 may be mounted on the top of a building which houses the remainder of the base station circuitry. The low noise amplifier 22 may be coupled to the remainder of the base station circuitry by a length of cable as illustrated by a cabling loss block 24 in FIG. 3. Within the base station circuitry, a mixer 26 converts the RF signal to a base band or intermediate frequency. A base band and demodulation unit 28 receives the output of the mixer 26 and produces data samples. A system controller 30 receives the data samples and performs a variety of functions. For example, the system controller 30 may calculate the power control adjustment command for transmission to the remote units based upon the demodulated information and the signal quality set point.

At least a portion of the energy output from the mixer 26 is passed to a detector 34. The detector 34 may be an analog or digital unit which estimates the instantaneous power received by the base station. For example, the detector 34 may sample the power level 64 times per second. The output of the detector 34 is passed to a load detection unit 36. In an alternate embodiment, the power level is determined with reference to the data samples.

In an alternate embodiment, the function of the detector 34 is carried out by a received signal strength indicator circuit. The received signal strength indicator circuit produces samples derived from the automatic gain control level used to set the gain of the receiver in response to the received signal strength.

In one embodiment, the load detection unit 36 comprises a process which determines the short term power received and a higher order moment of the power. In one example, the process uses each of the measurements received from the detector 34 over the period of one second in order to determine a short term mean power level and a variance. In addition, in one embodiment, the load detection unit 36 comprises a process which determines a ratio of a current loading to a predetermined capacity in response to the moment and the average power. In one embodiment, the load detection unit 36 comprises a process which performs the calculation given in Equation 3 in order to determine the estimated system loading level.

In one embodiment, the system controller 30 uses the calculated value of loading in order to implement an admission control algorithm which regulates the number of system users. A variety of admission control algorithms may be used in conjunction with the invention. In one example, the system controller 30 denies all new connection originations if the system loading has exceeded an overload threshold for more than five seconds. Alternatively, the system controller 30 denies all new connections including those generated by soft hand-off requests if system loading exceeds an overload threshold for more than ten seconds. In one embodiment, the algorithm incorporates hysteresis in that once the loading has exceeded a predetermined threshold, connection originations are denied until the loading falls below the overload threshold (or some other threshold) for some period of time. For example, the connection originations continue to be denied until the system loading falls below the overload threshold for three or more seconds.

Figure 4:
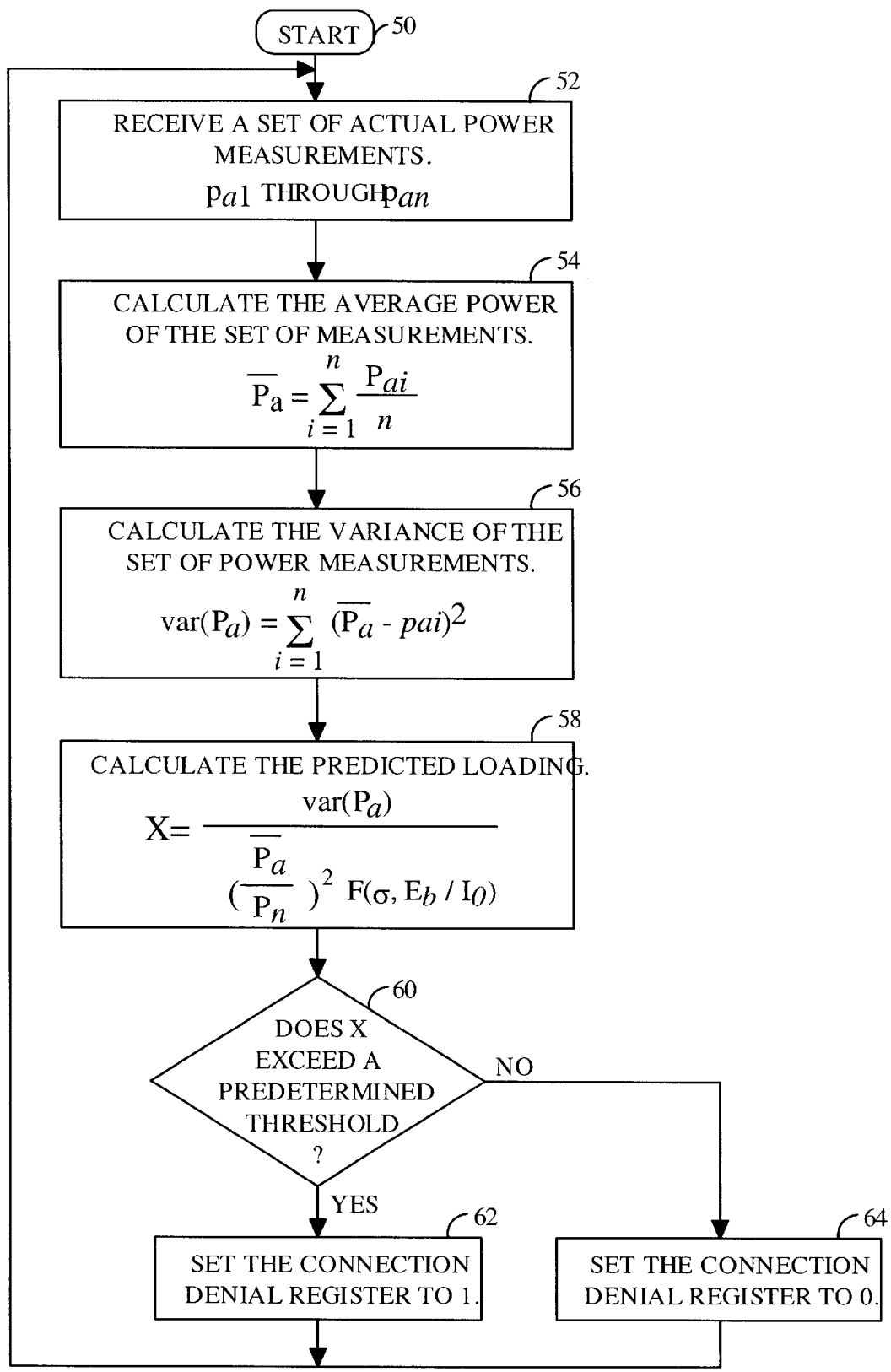
FIG. 4 is a flow chart showing an exemplary operation according to one embodiment of the invention.

FIG. 4 is a flow chart showing an exemplary operation according to one embodiment of the invention. The process begins in a start block 50. Flow continues to block 52 in which a set of actual power measurements are received at the base station. For example, the detector 34 may produce 64 actual power measurements per second in units of dBm and pass them to the load detection unit 36. In block 54, the short term dB mean of the set of actual power measurements is determined. In the exemplary embodiment of FIG. 3, the load detection unit 36 comprises a process which performs the calculation of block 54. In block 56, the dB variance of the set of power measurements is determined. By definition, the variance is determined by summing the square of the difference between the short term mean dB power measurement and each of the actual power dB measurements. In the exemplary embodiment of FIG. 3, the load detection unit 36 comprises a process which performs the calculation shown in block 56. In block 58, the predicted loading is calculated according to Equation 3. In the exemplary embodiment of FIG. 3, the calculation in block 58 is performed by a process within the load detection unit 36 based upon a value of " determined by a processing unit within the system controller 30.

In FIG. 4, blocks 60, 62 and 64 define a very simple admission control algorithm. In the exemplary embodiment shown in FIG. 3, the functions of blocks 60, 62 and 64 are performed by a processing unit within system controller 30. Block 60 determines whether the predicted loading exceeds a predetermined threshold. If so, flow continues to block 62 where a connection denial register is set to one indicating that any new connections should be denied. If the predicted loading does not exceed the predetermined threshold in block 60, connection denial register is set to zero in block 64 indicating that connection originations should be accepted. In the preferred embodiment, flow continues back to block 52.

In another embodiment, the invention comprises an overload detection mechanism which detects an overload condition based upon a value of a moment of the power level received at the base station. In this embodiment, the estimated loading according to Equation 3 need not be calculated, thus, conserving processing power.

The invention may be embodied in a system similar to the one shown in FIG. 3. In this alternative embodiment, the load detection unit 36 is replaced with an overload detection unit. The overload detection unit comprises a process which determines a moment, such as the variance, of the power level samples. The overload detection unit also comprises a process which determines an overload condition using the moment such as by comprising a process which compares the moment to a threshold. If the value of the moment exceeds the threshold, the system is declared to be operating at a potentially unstable point and, in one embodiment, future connection originations are denied. If the value of the moment falls below the threshold, new connection originations are once again accepted. The system may use hysteresis to increase the consistency of the overload determination.

The threshold value can be developed empirically. In particular, the threshold value can depend upon the wireless link characteristics which influence the fluctuations in the power level such as the presence of large reflective objects which increase the effects of fading in the system, the design of the physical layer interface such as the rate at which power control operates to correct for power level fluctuations and the mobility of the remote units. In one embodiment, the threshold value is responsive to a predicted or actual characterization of the remote units using the system. In one embodiment, the overload detection unit comprises a process which determines whether to accept or deny a connection origination request in response to said overload condition.

Figure 5:
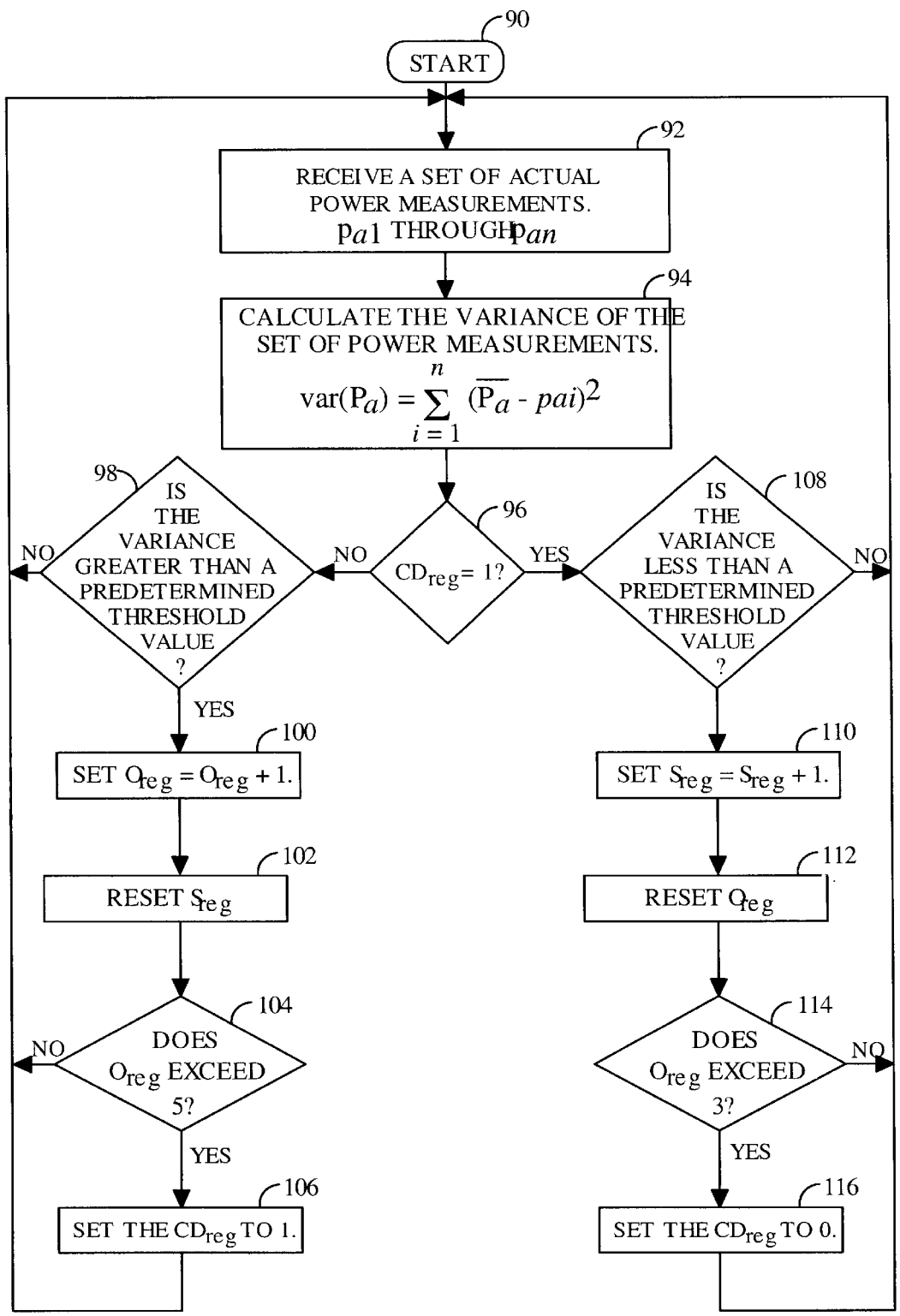
FIG. 5 is a flow chart showing an exemplary operation according to another embodiment of the invention.

FIG. 5 is a flow chart showing an exemplary operation according to an embodiment of the invention in which the variance is used to determine an overload condition. The process begins in start block 90. Flow continues to block 92 in which a set of actual power measurements are received. In block 94, the variance of the set of power measurements is determined. By definition, the variance is determined by summing the square of the difference between the average power measurement and each of the actual power measurements.

Block 96 determines whether the connection denial register is currently set to one. When the connection denial register is set to one, no new connection ordinations are permitted. When the connection denial register is reset to zero, new connection originations are permitted. If the connection denial register is set equal to zero, flow continues in block 98. Block 98 determines whether the variance is greater than a predetermined threshold value. If not, flow continues back to block 92. If so, the value stored in the overload register is increased by one in block 100. In block 102, the value in the stable register is reset to zero. Block 104 determines whether the value in the overload register exceeds five. If not, flow continues in block 92. If so, the system is deemed to be nearing unstable operating conditions and the connection denial register is set to one in block 106. Flow continues in block 92. In this way, while the system is accepting connection ordinations, if the variance exceeds a threshold for five successive calculations, the system detects an overload condition and sets the connection denial register to one.

Returning again to block 96, if the connection denial register is set equal to one, flow continues in block 108. Block 108 determines whether the variance is less than a predetermined threshold value which, in one embodiment, is the same value as used in block 98. If not, flow continues back to block 92. If so, the value stored in the stable register is increased by one in block 110. In block 112, the value in the overload register is reset to zero. Block 114 determines whether the value in the stability register exceeds three. If not, flow continues in block 92. If so, the system is deemed to have moved out of the unstable operating conditions and the connection denial register is reset to zero in block 116. Flow continues in block 92.

To the skilled artisan, a myriad of alternate embodiments of the invention just described will be readily apparent. For example, the power detection or received signal strength indication measurement may occur at radio frequency (RF), intermediate frequency (IF), or baseband. The calculation of the average power measurement may be supplemented or replaced by an analog or digital lowpass filter. Even though the invention was explained above with reference to a cellular system comprising a plurality of base stations, the invention may be implemented in a variety of systems where a plurality of users compete for access to a finite resource.

There are several variations of Equation 3 which will be readily apparent to one skilled in the art. For example, in Equation 3, the system performance set points is a signal to interference ratio in terms of the energy per bit to the average interference power density. The connection denial register may govern all new call originations, handoff requests or both.

The invention and the process which comprise the invention may be implemented in a variety of media including application-specific integrated circuits (ASIC), software running on a digital signal processor, a programmed storage device or other such media.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of overload detection, comprising the steps of:
   compiling a plurality of power measurements of a received signal comprising one or more signals from system users and interference;
   determining a moment of said plurality of power measurements; and
   determining an overload condition in response to said moment, wherein said step of determining said overload condition comprises the step of comparing said moment to a threshold value, and wherein said threshold value is responsive to a predicted characterization of said system users.

2. The method of claim 1, wherein said moment is a variance.

3. The method of claim 1, further comprising the step of determining whether to accept or deny a connection origination request in response to said overload condition.

4. The method of claim 3, wherein said connection origination is a new call origination.

5. The method of claim 3, wherein said connection origination is a handoff request.

6. A method of overload detection, comprising the steps of:
   compiling a plurality of power measurements of a received signal comprising one or more signals from system users and interference;

determining a moment of said plurality of power measurements; and determining an overload condition in response to said moment, wherein said step of determining said overload condition comprises the step of comparing said moment to a threshold value, and wherein said threshold value is responsive to an actual characterization of said system users.

7. The method of claim 6, wherein said moment is a variance.

8. The method of claim 6, further comprising the step of determining whether to accept or deny a connection origination request in response to said overload condition.

9. The method of claim 8, wherein said connection origination is a new call origination.

10. The method of claim 8, wherein said connection origination is a handoff request.

11. An apparatus comprising a process that when executed performs the method comprising the steps of:

determining a moment of a plurality of power measurements of a received signal comprising one or more signals from one or more remote units; and determining an overload condition in response to said moment, wherein said step of determining said overload condition further comprises the step of comparing said moment to a threshold value, and wherein said threshold value is responsive to a predicted characterization of said system users.

12. The apparatus of claim 11, wherein said moment is a variance.

13. The apparatus of claim 11, further comprising the step of determining whether to accept or deny a connection origination request in response to said overload condition.

14. An apparatus comprising a process that when executed performs the method comprising the steps of:

determining a moment of a plurality of power measurements of a received signal comprising one or more signals from one or more remote units; and determining an overload condition in response to said moment, wherein said step of determining an overload condition comprises the step of comparing said moment to a threshold value, and wherein said threshold value is responsive to an actual characterization of said system users.

15. The apparatus of claim 14, wherein said moment is a variance.

16. The apparatus of claim 14, further comprising the step of determining whether to accept or deny a connection origination request in response to said overload condition.

17. A multiple access communication system comprising a process which when executed performs the method, comprising the steps of:

determining an average power in a plurality of power measurements of a signal comprising signals from a plurality of users;

determining a moment of said plurality of power measurements; and determining a ratio of a current loading to a predetermined capacity in response to said moment and said average power.

18. The multiple access communication system of claim 17, wherein said ratio is equal to $$X = \frac{\mathrm{var}(P_a)}{(\overline{P_a})^2}\alpha$$

$\mathrm{var}(P_a)$ is said moment;

$\overline{P_a}$ is said average power; and $\alpha$ is a system constant.

19. The multiple access communication system of claim 18, wherein $\alpha$ is dependent on a predicted standard deviation of a single signal of said signals from said plurality of users and dependent upon a signal quality set point and wherein said signal quality set point is a target signal to interference ratio at which each of said signals from a plurality of users is received.

20. The multiple access communication system of claim 18, wherein the value of said system constant depends upon a predicted characterization of said plurality of users.

21. The multiple access communication system of claim 18, wherein the value of said system constant depends upon an actual characterization of said plurality of users.

22. The multiple access communication system of claim 17, further comprising the step of determining whether to accept or deny a connection origination request in response to said ratio.

23. A method of load estimation, comprising the steps of:

determining an average power in a plurality of power measurements;

determining a moment of said plurality of power measurements; and determining a ratio of a current loading to a predetermined capacity in response to said moment and said average power.

24. The method of claim 23, wherein said moment is a variance.

25. The method of claim 23, wherein said ratio is equal to $$X = \frac{\mathrm{var}(P_a)}{(\overline{P_a})^2}\alpha$$

$\mathrm{var}(P_a)$ is said moment equal to a variance of said plurality of power measurements;

$\overline{P_a}$ is said average power;

$\alpha$ is a system constant.

26. The method of claim 25, wherein said system constant is dependent on a predicted standard deviation of a single signal of said one or more signals and dependent upon a signal quality set point and wherein said signal quality set point is a target signal to interference ratio at which said one or more signals from system users are received.

27. An apparatus for overload detection comprising:

means for compiling a plurality of power measurements of a received signal comprising one or more signals from system users and interference;

means for determining a moment of said plurality of power measurements; and means for determining an overload condition in response to said moment, wherein said means for determining said overload condition comprises means for comparing said moment to a threshold value, and wherein said threshold value is responsive to a predicted characterization of said system users.

28. An apparatus for overload detection comprising:

means for compiling a plurality of power measurements of a received signal comprising one or more signals from system users and interference;

means for determining a moment of said plurality of power measurements; and means for determining an overload condition in response to said moment, wherein said means for determining said overload condition comprises means for comparing said moment to a threshold value, and wherein said threshold value is responsive to an actual characterization of said system users.

29. An apparatus for overload detection comprising:

means for determining a moment of a plurality of power measurements of a received signal comprising one or more signals from one or more remote units; and means for determining an overload condition in response to said moment, wherein said means for determining said overload condition further comprises means for comparing said moment to a threshold value, and wherein said threshold value is responsive to a predicted characterization of said system users.

30. An apparatus for overload detection comprising:

means for determining a moment of a plurality of power measurements of a received signal comprising one or more signals from one or more remote units; and means for determining an overload condition in response to said moment, wherein said means for determining an overload condition comprises the means for comparing said moment to a threshold value, and wherein said threshold value is responsive to an actual characterization of said system users.

31. An apparatus for overload detection comprising:

means for determining an average power in a plurality of power measurements of a signal comprising signals from a plurality of users;

means for determining a moment of said plurality of power measurements; and means for determining a ratio of a current loading to a predetermined capacity in response to said moment and said average power.

* * * * *